United States Patent

[11] 3,614,397

| [72] | Inventors | Walter L. Probert;<br>Steven R. Finch, both of Milwaukee, Wis. |
|---|---|---|
| [21] | Appl. No. | 874,932 |
| [22] | Filed | Nov. 7, 1969 |
| [45] | Patented | Oct. 19, 1971 |
| [73] | Assignee | Wisconsin Electrical Mfg. Co., Inc.<br>New Berlin, Wis. |

[54] BATCH-CONTROLLED READOUT SYSTEM
25 Claims, 6 Drawing Figs.

[52] U.S. Cl. ................................................. 235/92 WT,
235/92 R, 235/92 ST, 177/12
[51] Int. Cl. ................................................. G06m 3/02
[50] Field of Search .......................................... 235/92 (29
W), 65, 53, 59, 151.33, 98, 92 CA, 92 ST; 177/7,
12, 60

[56] References Cited
UNITED STATES PATENTS
3,035,648  5/1962  Williams ...................... 235/92 (29 W)
3,055,585  9/1962  Bell et al. ..................... 235/92 (29 W)

*Primary Examiner*—Maynard R. Wilbur
*Assistant Examiner*—Joseph M. Thesz, Jr.
*Attorney*—Andrus, Sceales, Starke & Sawall ABSTRACT: An asphalt-type batching printer unit includes a pair of scale potentiometers sequentially and selectively connected to corresponding batch controls and a counter circuit. The potentiometers are energized from the digital converter of the count circuit. The digital converter and a compare counter are applied to a digital comparator to control a clock pulse source. The clock pulse source is connected to the compare counter and to a net weight counter, a batch total counter, a truck total counter, and a daily total counter. The net weight counter is reset after each printing. During each print, an acknowledge switch is closed to again start the batch control. The aggregate batch control and counters print the aggregate scale tare and deliver several aggregate materials with net weight printing of each. The asphalt scale tare is stored and printed after the final aggregate print. The asphalt batch control delivers the asphalt and the amount is printed. After one batch is completed, a batch signal recycles for another batch or finish ticket signal provides readout of the several totaling counters.

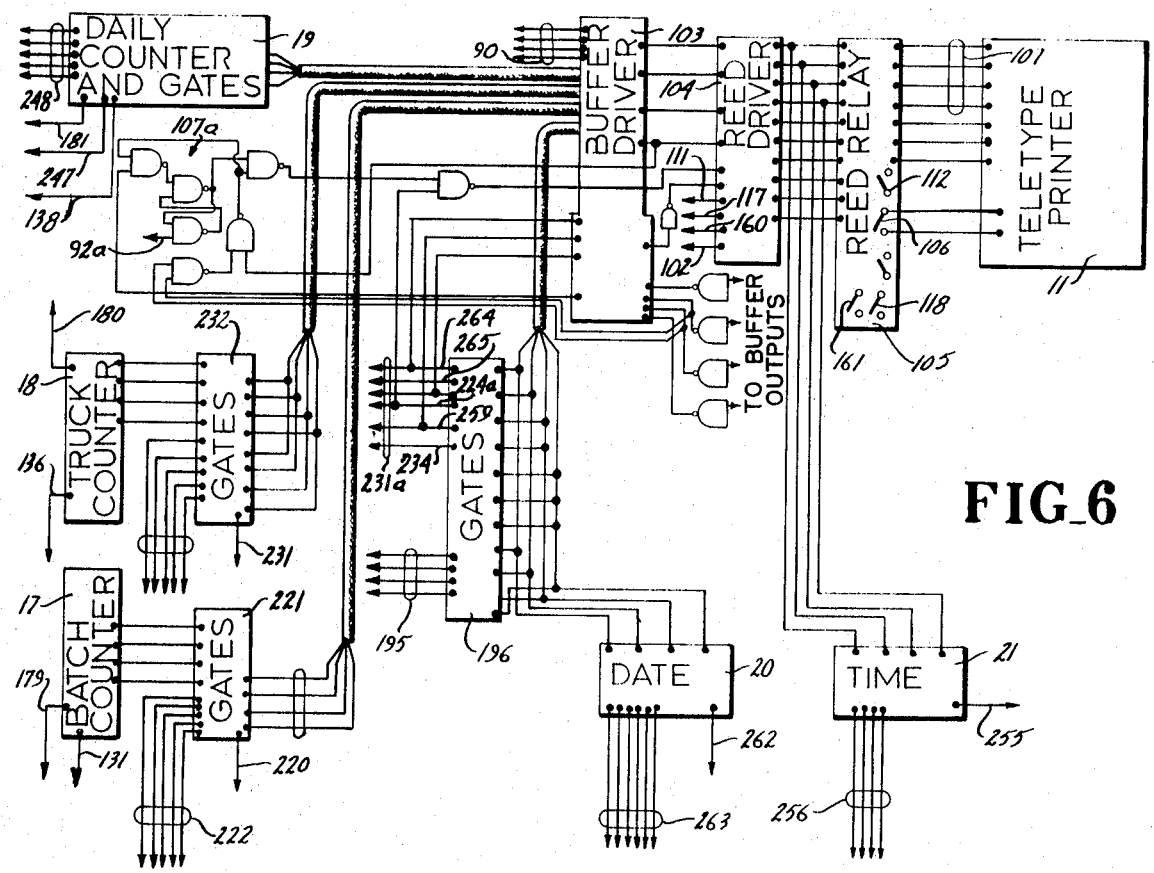
FIG_6
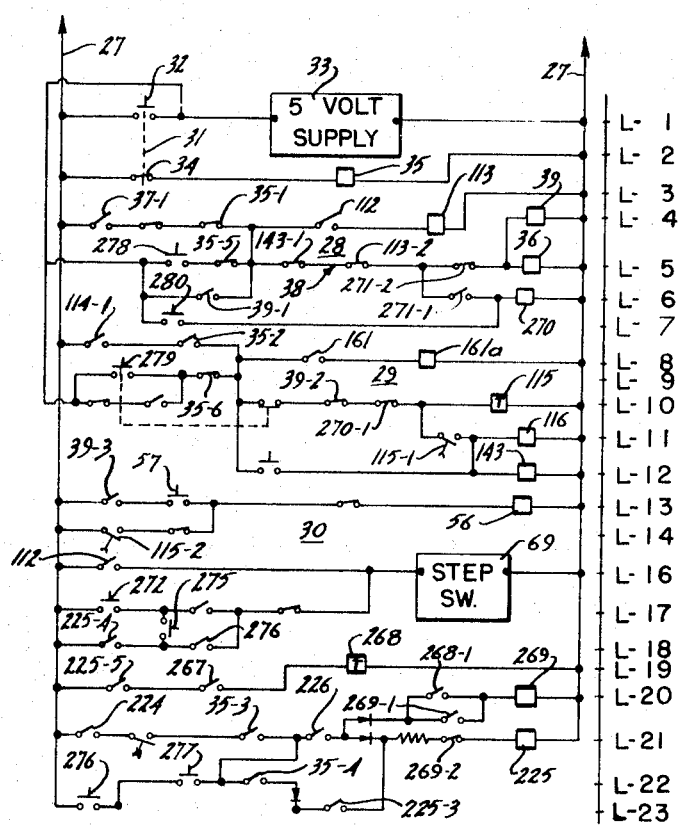
FIG_3
INVENTORS
WALTER L. ROBERT
STEVEN R. FINCH
BY
Attorneys

INVENTORS
WALTER L. PROBERT
STEVEN R. FINCH
BY

Attorneys

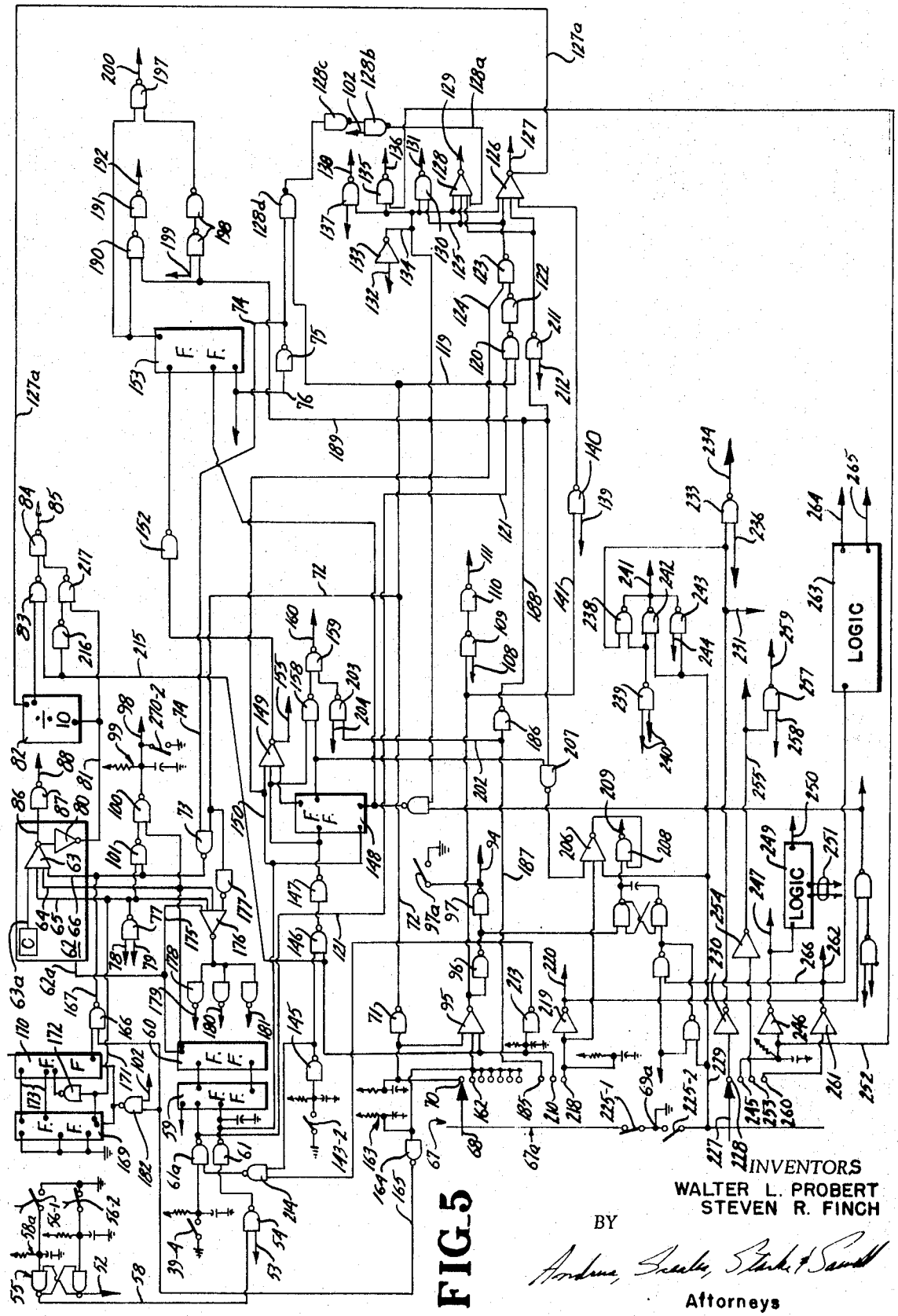

BATCH-CONTROLLED READOUT SYSTEM

BACKGROUND OF INVENTION

This invention relates to a batch controlled readout system and particularly to the recording of the interconnected processing of a plurality of materials such as in weigh-batching systems for mixing of concrete, asphalt and the like.

Automated batching systems are widely employed wherein various materials are intermixed in precise preselected amounts or volumes to meet finished product standards and specifications. Automated systems permit more accurate delivery of material as well as a more rapid and greater production. For example, road-building materials such as concrete and asphalt batching plants may advantageously employ automated batching systems. Concrete and asphalt mixtures for road building and other applications, however, require variation in formulas for mixture in accordance with the geographical area and particular working conditions to which the material is subjected. In many cases, particularly where the roads are being built to state or federal specifications, specifications require automatic batching and recording of one or more of the batching steps.

The present invention is highly adaptable to the automatic recording of such automatic processing apparatus and is described hereinafter in connection with an asphalt batching system for purposes of explanation. However, the invention may be employed in any other batch processing and in any other industry where an automated record of the batch processing is desired. Thus, in the area of dairy products, feed and grain processing, ceramics, plastics, castings and the like, requirements of increased production and quality control are resulting in more and more automated batch processing and recording of the mixtures.

Although systems have been available wherein the several accumulated weights of each material as well as daily totals were set up in separate storage registers on a limited basis, the number of storage elements may rapidly become excessive and require special constructions because the conventional business machines for ticket printing do not have the necessary capacity. Conventional approaches, therefore, become relatively complex and expensive. Further, the limited flexibility of conventional printing systems make modification of a standard design to meet varying specifications difficult and generally require individual design.

SUMMARY OF INVENTION

The present invention is particularly directed to a batching process readout means which produces an accurate recording of the proportionings of the materials during the batching process.

Generally, in accordance with the present invention, the automated or manually controlled batching control unit is interlocked with a digital-type recording system to automatically provide sequential material delivery and measuring thereof and transfer of the quantity into a readout means, generally having a reading and recording system. The batching control establishes the material delivery sequence with a measuring and memory means to retain the delivery information. When it is desired to establish a record of the material delivered, a signal is transferred to the readout means which is connected to the memory means and automatically responds to record the necessary information and establish an acknowledgment signal which is supplied to and actuates the batching control to continue in it sequence. In a particularly novel aspect of the present invention, the batching control system employs an analog signal to control the automatic feed of material to a receiving means, with a related analog signal generated or formed which is related to the quantity of material delivered. The analog signal is applied through the sequencing and transfer control means to the readout system where it is converted into digital form for subsequent recording processing. Thus, the U.S. Pat. No. 3,252,530, which issued to Alton G. Bale, Jr. discloses a highly satisfactory analog weigh-batching control system employing precision scale potentiometers interconnected to a weighing scale to produce an analog control. The scale potentiometer is selectively connected directly from the batching control to the recording system to provide an analog input signal to an analog-to-digital converter. In accordance with a particularly novel aspect of the present invention, the potentiometer is energized from the digital converter with a resulting essentially self-compensation for any drift or the like in the power supply. The digital converter is applied as one input to a digital comparator with a compare counting device providing a second input to establish an input to the recording system corresponding to that of the output of the digital converter. The pulse train to the compare counting device can be supplied to one or more counting devices to provide a digital record of the process. For example, the output can be simultaneously applied to a net weight register or counter for the particular material, a batch total counter, a daily total counter or the like. When the record is established, an acknowledge signal is issued to initiate a readout cycle for recording one or more of the inputs to the registers. An acknowledge feedback signal can then be also provided to provide for continuation of the batching control. A Teletype machine which accepts a plurality of inputs in parallel in combination with a commutator serializing means for sequentially transferring the information from the several parallel lines to an output typing element for establishing a permanent ticket or record of the process has been found to provide an unusually satisfactory and practical printout.

In processing controls, particularly for building materials and the like, automatic compensation is sometimes normally required for the initial scale readings and the like, normally called "tare compensation." In accordance with the present invention, such a record may be established and the tare compensation automatically maintained in the register to provide a true net weight recording of the material being delivered. Further, the tare may be negative or positive depending upon the particular situation. Both may be recorded or only the positive tare may be recorded for simplicity and clarity of presentation. Polarity-sensitive means provide the desired compensation with or without recording.

In a particularly practical and satisfactory system as applied to an asphalt-type batching process, the sequence was established to record and print the aggregate tare. During the printing cycle and prior to actual batching, the asphalt tare was recorded and stored. The batching control was then sequentially actuated to feed the desired aggregate material in sequence with an automatic print of the net weight of each aggregate delivery. The asphalt tare as stored in the unit was then printed after which actual delivery was recorded. The asphalt delivery is made to a separate measuring unit and thus may be batched during the aggregate feed cycles. The batch total was then printed out with a signal which provided for establishment of a second batch to be similarly recorded and delivered, or a finish ticket readout providing a truck total which was equal to the summation of the individual batches, a daily total delivered to date, the time and the date of the final finished ticket. Thus, in the above example, the automatic control employed the digital converter and a compare counter providing inputs to a comparator. Simultaneously with the operation of the compare counter, the counting of the compare counter from one reading to the next provides the pulse train equal to the difference, or the net weight of material added. Signals were fed to a net weight counter, the output of which was employed to provide the recording of the different tares as well as the amounts of the individual materials delivered. Thus, the net weight counter was reset after each printout and before printout of the subsequent material.

The count was also applied to a separate batch total counter, a truck total counter and a daily total counter with the required resetting at the appropriate time to maintain the desired true records.

The system is particularly versatile in that the separate transfers and resettings permit wide variation in recording and programming the readout system. Thus, additional information such as a truck number, load number, address, and the like can be manually entered or automatically entered into the readout system. For example, it may be desirable to provide separate storage registers to totalize the several formulations which are employed or to maintain a continuing inventory control. The requirements of compensating for and recording the tare settings of weighing systems varies from state to state. Consequently, the system provides a distinct advantage in permitting programming to the desired requirements. For example, in certain states, the tare reading is not compensated for and the net weight counter provides an accumulated scale reading. The batch total counter may not be reset and provide a continuing accumulation of successive batches and, in effect, become the truck total. These and many other variations can readily be supplied with the present invention based on the means for controlled counting into various recording and counting devices with controlled resetting to permit the desired recording in sequence.

In accordance with a further aspect of the present invention, a lockout count system is provided to maintain the batching control inactive if the scale reading is less than a previous reading inserted into the comparator. Although this will not occur under normal batching where relatively widely different amounts or generally similar amounts are fed into the receiving means, it may be a factor where relatively small amounts of material must be added. For example, in an asphalt batching system, small amounts of mineral fill material are generally added to each batch. However, where the receiving means in such systems may be subject to unusual vibrations, the compare counter may be on a value greater than the digital converted input to the comparator. In order to establish a proper comparison, the compare counter would have to come to the maximum or overflow and then reinitiate counting in order to arrive at the count equal to the digital output. Obviously, this would result in a completely unacceptable error.

In accordance with the present invention, the system is established such that before a comparison is established, the digital converter must provide an input which is one count greater than the reading on the comparator in order to establish a pulse at the output control line. Any error so introduced is essentially insignificant particularly as compared to the tremendous possible error if the compare counter must recycle or overcount. This system has been found to provide a completely practical and acceptable solution.

The present invention thus provides a relatively simple, inexpensive and reliable readout which can be employed to establish and maintain a permanent record of all processing. The readout or printer employs the same encoder as the basic batching control and requires a single digital converter for a plurality of different reading or receiving measuring devices.

BRIEF DESCRIPTION OF DRAWINGS

The drawings furnished herewith illustrate the best mode presently contemplated by the inventors for carrying out the subject invention in which the above advantages and features are clearly disclosed as well as others which will be readily understood from the following description.

In the drawings:

FIG. 3 is a schematic relay control circuit for interfacing of the batch control and the readout control in one embodiment of the invention;

FIG. 5 is a diagrammatic block-type diagram showing a logic control circuit operated in conjunction and forming a part of the sequencing control for operating of the reading and printout means; and FIG. 6 is a block diagram of a typing unit for the automatic printing of the information onto a ticket as shown in FIG. 2.

DESCRIPTION OF ILLUSTRATED EMBODIMENT OF THE INVENTION

Figure 1:
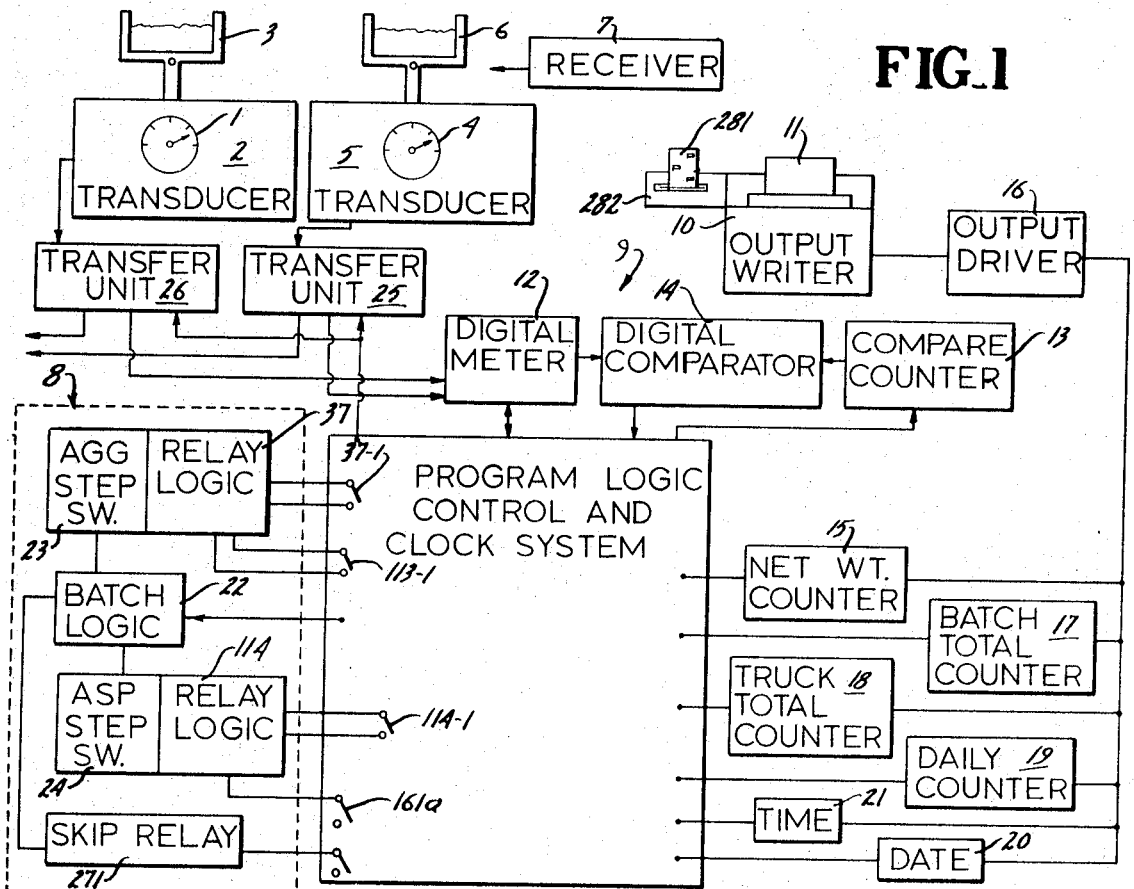
FIG. 1 is a block diagram illustrating an asphalt batching control constructed in accordance with the present invention.

Referring to the drawings and particularly to FIG. 1, the present invention is shown applied to an asphalt batching plant for purposes of clearly disclosing a particular application of the present invention to the recording of a process control. Referring particularly to FIG. 1, an asphalt scale 1 is provided having an electrical output transducer 2 providing an electrical signal proportional to the weight of asphalt material fed to a material hopper 3. Similarly, an aggregate scale 4 is provided having a transducer 5 to provide an electrical signal in accordance with the aggregate material supplied to a hopper 6. A truck or other receiving means 7 is movably mounted adjacent to the hoppers 3 and 6. For example, a given batch may require different amounts of up to five different aggregates, a small amount of mineral fill and a selected amount of asphalt. The asphalt is separately weighed and the several aggregates and mineral are sequentially fed to the hopper and finally transferred to the receiver 7 to produce a given batch. Due to physical limitations of the equipment, a series of individual batches may be mixed and provided to a single receiver 7 by recycling of the batching process.

An automatic batching control unit 8 is provided and interconnected to automatically control the proportion and amounts of material delivered to the respective hoppers 3 and 6 in the proper sequence. A highly satisfactory material delivery system is shown in the previously identified U.S. Pat. No. 3,252,530 issued to Alton G. Bale, Jr. on May 24, 1966. The batching control circuit is interlocked with a readout and printout system 9 having an output writer 10 such as a Teletype unit for printing of the desired information on a ticket 11 as shown, for example, in FIG. 2 and more fully described hereinafter. The printout system 9 may also conveniently provide a machine-readable record, such as a punched tape or the like and the terminology printing is hereinafter employed to broadly define any such permanent record.

The illustrated printout system 9 includes an analog-to-digital converter shown as a digital meter 12 coupled through the batch control circuitry to the transducers 2 and 5. The outputs of the converter 12 and a compare counter 13 are connected to a comparator 14. To read the weight for transfer to the output writer, the output of the converter 12 is impressed upon the comparator 14 and the compare counter 13 then operates to count with respect to the digital converter. The pulse train is fed into the compare counter and simultaneously into a net weight counter 15 which receives the signal and is interconnected through an output driver stage 16 to record the corresponding weight in the output writer 10 and thereby on the ticket 11 as more fully described hereinafter. In the illustrated embodiment of the invention, a batch total counter 17 is selectively connected into the circuit to record the total weight of material in a given batch. As previously noted, more than one batch may be required for any given truckload or the like, and in the illustrated embodiment of the invention, a truck total counter 18 is shown to record the total weight of material delivered to the truck. In addition, a daily total counter 19 is provided to record the total amount of material delivered at any given time within each day. In addition, each ticket may be provided with a date and time through a presettable date input unit 20 and a clock or time input unit 21. In addition, the system may be provided with any other form of information which it is desired to record. For example, it may be desirable to provide an automatic addressing device coupled into the control and operating the output writer 10 to directly address the ticket 11 in response to the initiation of the control system. Additionally, a truck number, load number and the like might be provided either through an automatic or manual input.

The automatic batching control system may advantageously be similar to that shown in the previously identified U.S. Pat. No. 3,252,530 to Alton G. Bale, Jr. A similar system is shown in block diagram for purposes of simplicity and clarity of explanation as including a relay logic switching circuit including a basic batch logic control unit 22. An aggregate control stepping switch 23 and an asphalt control stepping switch 24 are provided and interconnected with the batch logic control to provide the desired automatic control of the feeding of the material to the respective hoppers 3 and 6 in proper sequence and timed relationship.

The readout control circuitry includes an aggregate transducer transfer unit 25 selectively connecting the aggregate scale transducer 5 into the weighing circuit to automatically terminate the feed of each of the aggregate materials to the hopper 6 after a predetermined amount has been fed thereto. After each delivery of a material, the unit 25 interconnects the aggregate scale transducer 5 to the digital meter 12 for recording of the weight on the ticket 11 as hereinafter described. Similarly, an asphalt transducer transfer unit 26 alternately connects the transducer 2 into the asphalt-weighing circuit and to the digital meter to provide similar transfer and recording of the asphalt for each batch process.

A preferred readout and printout system is shown in FIGS. 3 through 6, inclusive. In this system as shown by the information on the ticket 11 in FIG. 2, the tare condition of the scales 1 and 4 are first detected and the aggregate tare reading is printed on the ticket 11 while the asphalt tare is stored within the unit for subsequent printout. The aggregate material is thus fed in sequence to the hopper 6. Each material is received and weighed, and the transducer transfer unit 25 is actuated to transfer the information into the readout system where it is recorded on the ticket 11. The batching control 8 then receives an acknowledge signal to deliver the second material. The batching control and the readout printer are thus interlocked to provide sequential delivery recording and discharge for each of the materials. After all of the aggregate material has been received, the asphalt tare which has been retained in the unit is transferred to the ticket 11. The asphalt material which is delivered to the hopper 3 during the aggregate delivery portion is transferred to the ticket 11, and the batch total printed, after which a ticket-finish signal or a recycle signal is given depending upon whether a single batch is to be delivered to the receiver 7. In the illustrated ticket 11, a pair of individual batches were delivered and separately recorded. At the finish-ticket signal, the truck total count 18, the daily counter 19, the time unit 21 and the date unit 20 are operated or scanned in sequence and the information transferred to the ticket 11 after which all of the counters with the exception of the daily counter 19 will be reset and thus be in standby condition for the next batch process.

Referring particularly to FIG. 3, an across-the-line-type circuit diagram is shown for readout relay control and interlocked system or circuit. For purposes of reference, each of the horizontal lines of the diagram is identified along with right edge by the successive numbers L-1, L-2, etc. beginning at the top and proceeding to the bottom. The relay control is connected to 110-volt alternating current supply line 27 and generally includes an aggregate control section 28, an asphalt control section 29 and a print and sequence control section 30.

A manual-automatic-off three-position switch unit 31 is provided having a plurality of different contacts or switches. A first switch 32 in line L-1 connects a logic power supply unit 33 to line 27 and supplies power to the logic unit shown in FIG. 5. A second switch 34 in line L-2 is connected in series with an automatic control relay and is closed only with the three-position switch in the automatic position. An automatic relay 35 is connected through the switch 34 to the power lines 27 and includes normally open contacts in the respective circuits identified as contacts 35-1 in line L-3 of the aggregate control section 28, contacts 35-2 in line L-8 of the asphalt control section 29 and contacts 35-3 in line L-21 in the sequence control section 30. The operation of the circuit in the illustrated embodiment of the invention is initiated with the measuring of the aggregate scale tare and printout thereof and consequently, the description is given beginning with the aggregate control section 28.

An aggregate transfer relay 36 in line L-5 is connected in circuit through the contacts 35-1 and a set of normally open contacts 37-1 of a batch logic control relay 37 as shown in FIG. 1. The aggregate transfer relay 36 forms a part of the aggregate sequencing relay unit 25 associated with the aggregate scale transducer in FIG. 1.

The relay 36 is energized when the contacts 37-1 close through the contacts 35-1 and a plurality of normally closed contacts in line L-5, hereinafter described, and selectively transfers the transducer 5 to the readout system. A printer interlock relay 39 is connected in parallel with the relay 36 and is energized simultaneously and correspondingly therewith. The relay controls a set of latching contacts 39-1, in line L-6, connected to the power lines in parallel with the control relay contacts 35-1 and 37-1 and latches the relay branch line L-5 to the lines 27 under the control of the normally closed contacts in branch 38. The relay 39 also controls a set of normally closed contacts 39-2 at line L-10 to provide an interlock preventing operation of the asphalt control section 29 during the operation of the aggregate control section 28.

Figure 4:
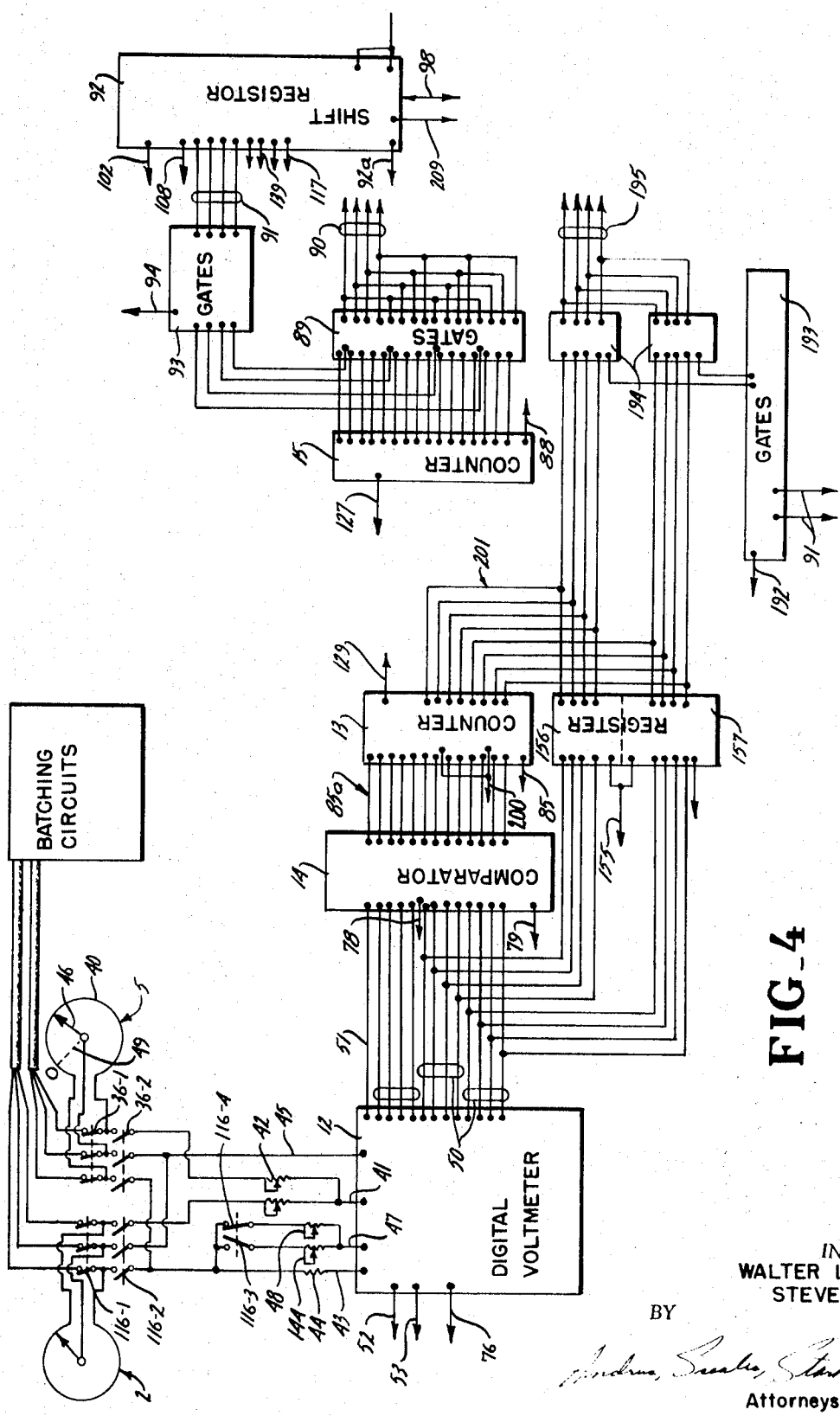
FIG. 4 is a schematic and diagrammatic circuit illustration of the interconnection of the batch-weighing analog transducers into a digital counting system in accordance with the present invention.

Referring particularly to FIG. 4, the interconnection of the scale transducers into the printing circuitry and controls illustrated in a preferred construction. In particular, the transducer 5 is shown as a precision potentiometer 40 selectively connected to the batching circuits to provide an output signal directly related to the preset material feed. The potentiometer 40 is shown in the illustrated embodiment connected in the batching circuit through normally closed contacts 36-1 of an interlocking relay 36 for purposes of simplicity of description and alternatively into the circuit of the digital voltmeter through the normally open contacts 36-2 to transfer the analog signal on the potentiometer into the printout means and, in particular, to the digital voltmeter 12.

In the preferred construction, the voltage for energizing the potentiometer 40 is derived from the digital voltmeter as follows. A positive polarity signal line 41 is connected in series with a variable resistor or potentiometer 42 to the one side of the potentiometer 40 in series with one set of normally open contacts 36-2. The opposite end of the potentiometer 40 is connected via other contacts 36-2 to the negative line 43 of the low-voltage DC power supply in series with a balancing resistor 44. A high or analog signal line 45 is connected to the slider tap 46 of the potentiometer through the third set of relay contacts 36-2. The low or common line 47 of the analog signal is connected in series with a zero adjust potentiometer 48 and a set of normally closed contacts, referred to hereinafter, to the negative power line 43 and thus to the opposite end of the potentiometer 40.

The potentiometer 40 is energized in the batching circuit and in the printout circuit such that the measured zero is offset with respect to the physical zero as at 49. In an actual construction, the reading or the measuring zero was selected at 200 ohms on the scale potentiometer. This eliminates constant wiping over the ends of the potentiometer when the receivers are empty and there is considerable mechanical vibration in the scale system.

Thus, upon energizing of the relay 36, the potentiometer 40 is removed from the batching circuit and transferred into the digital voltmeter 12 of the readout system.

The digital voltmeter 12 which is shown in block diagram may be of any suitable variety which is adapted to convert the analog signal into a related digital signal. For example, the applicants have found that a voltage-to-rate digital voltmeter provides a satisfactory conversion system. A similarly accurate control and response has been obtained with a dual-slopetype unit. In either case, the analog-to-digital meter is reset at the initiation of each input and counts in proportion to the analog signal to establish corresponding digital output signal lines. In the illustrated embodiment of the invention, a binary-coded decimal system is shown having four significant digits with the first three digits encoded upon four similar lines 50 for each digit and the most significant digit being either a 1 or 0 and having a single-digit line 51. This allows counting to 1,999 before requiring recycling. The digital voltmeter 12 is triggered from an external trigger signal line 52 as presently described and, in turn, generates a print command signal at a line 53 to provide an interlock with the gate logic circuit as shown in FIG. 5.

Thus, in FIG. 5, a two-input gate 54 has one input connected to the print command line 53. The second input of the gate 54 is connected to the output of a flip-flop unit which, in turn, simultaneously supplies a signal to the external trigger line 52 to provide sequential triggering of the digital voltmeter and feedback to the gate 54. The initiation of the control is actuated by a timer relay 56 in line L–13 of FIG. 3.

The relay 56 is connected to the power lines 27 in series with a set of normally open contacts 39–3 of the aggregate section relay, a switch 57 of the manual on-off switch 31 and a ticket-in switch. Thus, when the several switches are closed, the timer relay 56 is energized and, after a selected time delay, closes the associated normally open contacts 56–1 and 56–2 in the logic control circuit of FIG. 5 to provide an output signal at line 58 which is connected as a second input to the two-input gate 54. The time-delay switching is inserted into the circuit to allow the settling of the transfer relays and, in particular, the transfer of the transducer potentiometer 40 of the aggregate scale transducer 5 into the printer circuit. Thus, when the contacts 56–1 close and the contacts 56–2 open, the flip-flop circuit reverses its position. The gate networks include an internal supply connection establishing logic 1 at the input line or lines which may be enhanced by a transient suppression resistor-capacitor network 58a.

The flip-flop 55 provides a binary 0 to 1 transition or logic signal to the external trigger 52 to initiate operation of the voltmeter 12 in FIG. 4 and simultaneously transmits the logic 1 to the two-input gate 54. The voltmeter, in time, establishes a positive pulse signal at a print command line 53. The gate 54 is thus triggered from the two interrelated elements providing redundancy for purposes of noise protection and the like. As a result, the gate 54 provides a logic 0 output signal which is transmitted and applied as the input to the first of a pair of count-synchronizing flip-flop circuits 59 and 60. A gate 61 is inserted between gate 54 and the flip-flop unit 59 to maintain proper logic signal and an aggregate interlock gate 61a provides a second signal to the flip-flop unit 59 as a result of closing of a set of contacts 39–4 of the aggregate print relay 39 in line L–4 of FIG. 3. The latter gate 61a during the aggregate cycling is at a logic 1 and permits operation of the flip-flop unit 59. The synchronizing flip-flops of 59 and 60 are cascaded and interconnected to control a counting clock 62 and, in particular, a three-input Nand-gate 63 having a first input line 64 connected to the flip-flop 60, a second input and cutoff line 65 providing a material interlock and a third polarity-sensitive input line 66. All lines 64–66 must be provided with a logic 1 signal in order to enable the clock and allow transmission of clock signals from 63a. A clock line 62a feeds back from the clock to the flip-flop 60. Thus, the random print command signal which sets the flip-flop 59 is synchronized by flip-flop 60 with the clock pulse. The input to the control line 64 will be going to logic 1 at the same time that the clock line 62a is going to zero. The clock will then be enabled to transmit pulses via the gate 63 assuming the lines 65 and 66 are also provided with a logic 1 signal at that time.

The line 65, in the initial starting position, is provided with a logic 1 and is interconnected into the circuit as subsequently described. The polarity-sensitive line 66 is connected into circuit in the initial position through a logic board stepping switch assembly 67 including a first stepping switch section 67a having a contact arm 68 adapted to be sequentially driven from a home or first contact to a series of nine succeeding contacts. The arm of contact 68 is driven by a step-drive relay or coil 69 shown in line L–16 at the end of each printing cycle. The contact arm 68 bridges the several contacts and a common ground line 69a to selectively ground logic inputs to logic gates which are of a known or any desired solid-state construction.

The home or initial contact 70 constitutes an aggregate tare count and print contact which is interconnected into the circuit to provide for automatic transfer of the tare weight of the aggregate scale into the printing unit and to then print the amount on the ticket in the location illustrated in FIG. 2, as follows.

The contact, as shown in FIG. 5, is connected via a gate 71 and a line 72 to a polarity-sensitive two-input gate 73, the output of which is connected to line 66 of clock 62. The second input line 74 of gate 73 is connected to the output of a gate 75, the input line 76 of which is connected as a polarity-sensitive signal line at the digital voltmeter 12, shown in FIG. 4. Thus, when the digital voltmeter 12 is triggered to count, it counts in proportion to the analog signal and simultaneously provides a positive or negative polarity signal at line 76. If the polarity is negative, a binary or logic 0 signal is transmitted via the line 76 to the gate 76 establishing the logic 1 to the gate 73. With two 1's on the gate 73, a 0 is held on line 66 preventing operation of the clock 62. This prevents counting of negative tare in the illustrated embodiment. The system may be readily adapted to provide for printing of such negative tares, if desired, for any reason. Recording of a negative tare may only tend to cause confusion to the operators of the batching plant and consequently, it may be desirable to treat a negative tare as no tare. The negative tare would merely be sensed and the system interlocked to prevent counting and thereby provide sequencing as if there was a zero tare.

Assuming that a positive tare exists, the corresponding positive logic 1 signal is supplied to the line 76. The polarity-sensitive signal applied to the second input gate line 74 then remains at a logic 0 and the line 66 is positive logic 1. The line 66 is thus at a positive 1 for conditioning of the Nand-gate 63 to transmit the clock pulses. The third input line 65 is connected, as previously noted, to a normal logic 1 control to permit counting.

Line 65 is also connected to the output of a comparator gate 77 for terminating of the count when a pair of input lines 78 and 79 to the gate 77 are provided with corresponding 1 signals. The leads or lines 78 and 79 are connected to the output of the comparator 14 of FIG. 4 and provide a turnoff signal when the input from the digital voltmeter 12 to the comparator 14 is exactly equal to the input from the compare counter 13.

Thus, upon initiation of the print cycle, the digital voltmeter 12 counts up in proportion to the analog signal, presents a binary-coded decimal format to the comparator 14, and establishes the start pulse signal at line 53. The clock 62 transmits a pulse train signal to the compare counter until it equals the number presented by the digital voltmeters as follows.

Referring particularly to FIG. 5, the clock includes a gate 80 connected to the output of gate 63 and providing a first-gated clock signal at line 81. This signal is applied to a divided-by-10 counter 82 in the illustrated embodiment of the invention based on a design counting the aggregate by 10-pound increments. The output of the counter 82 is applied to a first aggregate counting gate 83 which provides an asphalt interlock as hereinafter described and a coupling gate 84 to provide a corresponding pulse signal at a comparator count line 85 which is interconnected to drive the compare counter 13, as shown in FIG. 4.

The compare counter 13 is a suitable digital counting device which counts up and establishes a binary-coded decimal signal encoded on coupling lines 85a which generally correspond to and are grouped in accordance with the lines 50 and 51 from the digital voltmeter 12. When the number in the compare counter 13 equals the number in the digital voltmeter 12, the signal lines 78 and 79 from the comparator 14 provide a corresponding logic 1 signal and an indication of the equal numbers. The logic 1 signals simultaneously applied to the gate 77 in FIG. 5 establish a logic 0 at line 65, thereby turning off the Nand-gate 63 and terminating the count.

Simultaneously, with the driving of the compare counter 13, a corresponding count is inserted in the net weight counter 15 via the clock 88 from clock 62. A gate 87 connects the clock line 86 to the net weight counter input line 88. Thus, at the end of the counting cycle, corresponding numbers are inserted in the compare counter 13 and the net weight counter 15 corresponding to the aggregate scale tare.

The net weight counter 15 is connected to the Teletype or printout unit shown in FIG. 6 through a bank of Nand-gates 89, the output of which includes four bus lines 90, one for each of the four significant digits, as shown in FIGS. 4 and 6. The bus lines 90 are sequentially enabled in FIG. 4 to transfer the corresponding digits to the printout unit in response to signals applied to logic control lines 91 from a shift register 92. The shift register 92 is a suitable sequencing unit such as a ring-type solid-state counter unit with each cycle of the shift register sequentially stepping to and enabling a control line and at each position allowing a printout of a given character, or establishing a space or a null with some other control functioning being established at the point. The illustrated unit which has ten control lines permits typing or registering of a maximum of 10 characters, one for each position of the shift register.

In connection with the aggregate tare typing cycle, the first two positions of the shift register are for purposes of illustration employed in an interlocking control or the like and the aggregate is printed out on steps 3, 4, 5 and 6, each of which provides an enabling signal to the corresponding sequencing control line 91 which are interconnected to the corresponding Nand-gates of the shift 89 through individual coupling and transfer control gate unit 93. A net weight counter enable signal line 94 under the control of the stepping switch unit 67 of FIG. 5 is connected to enable gates 93 in the aggregate and asphalt weight printing cycles. The enable line 94 is controlled from a Nand-gate 95 having one input connected to the line from the first position contact 70 of the stepping switch unit 67. The output of the gate 95 is connected to a pair of series-connected gates 96 and 97 to the enable line 94. Thus, upon actuating of the logic circuit, the enable line 94 is energized to a logic 1 and conditions the gates 93 for transmission of the sequencing signals from the shift register 92 during the sequencing of the shift register. In certain installations, the system specification may require means to eliminate write out of the net weight of materials. In the illustrated embodiment, a manual control switch 97a is connected to line 94 and ground to selectively prevent enabling during the operating cycle.

The shift register 92, in turn, is triggered in the tare readout cycle, from a start line 98 under the control of the input line 64–66 of the clock 62. Thus, the shift register line 98 as shown in FIG. 5 is connected to a pulse source 99. A two-input gate 100 provides a "1" to "0" transition at the shift register line 98 for initiating operation of the shift register 92. The gate 100 has one input connected to line 64 and thus directly to the output of the synchronizing flip-flop 60 and a second input connected to the output of a two-input gate 101. Lines 65 and 66 are connected as the inputs to the gate 101. When the counter counts to the compare level signal, the gates 78 and 79 are both "1's" generating a "0" at one of the inputs to gate 101 which raises its output to a "1" and generates a "1" to "0" transition on the line 98. This initiates operation of the shift register 92 which then sequences through a self-latching circuit with feedback from the typing unit to produce the desired shifting through the 10 stages or positions.

In the first step, a signal line 102 is energized and provides an input signal to the printout unit of FIG. 6. Thus, the illustrated printout unit is a Teletype construction and generally requires a buffer-driver stage or bank 103 to which the bus lines such as lines 90 from the net weight counter 15 are connected. A reed relay driver bank 104 is connected to the output of the buffer stage 103 and connected as an input to a reed relay bank 105. The reed relay bank 105 controls the sequencing of the input to the Teletype 11 as well as a plurality of interlocking contacts in response to closing of a set of contacts 106 in the relay bank 105. The reed relay 105 selectively connects a seven-line input of the Teletype typing unit which is adapted to accept, in parallel, up to seven switch closures, to a common line. During a typing cycle, a commutator serializes the information from the seven lines based on the U.S.A. Standard Perforated Tape Code for Information Interchange. In accordance with the well-known construction, four of the lines 107 are binary-coded decimal and thus provide a convenient means for accepting the output from the binary-coded decimal counters employed in the present invention. Combination of the other three lines select different groups of characters or control functions for proper driving of the typing apparatus.

When the trip coil signal line 102 is energized, it provides a signal through the reed driver 104 actuating the reed relay bank 105 to close trip coil contacts 106 and start the Teletype unit 11. As previously noted, on the third, fourth, fifth and sixth positions of the shift register, the lines 91 are enabled and the digital signals appearing at lines 90 from the net weight counter are fed by the buffer-driver 103 to the relay bank 105 and the information is fed into the Teletype unit which operates to print out the tare weight.

All four decades of the net weight counter 15 are enabled and steps three and four would print the first two most significant digits. Generally, a tare reading will never be in excess of the two least significant digits and, consequently, under normal conditions, the typewriter would print a zero. In order to improve the appearance of the ticket, the present invention may provide a zero-inhibit circuit 107a, as shown in FIG. 6, to inhibit the zero print and merely space the typewriter. The circuit 107a is connected to the buffer-driver 103 as shown and to the home position shift register line 92a. At the fifth and sixth positions, however, the fifth line to the Teletype unit is enabled and if a number appears, it is printed. However, if no number appears, the typewriter prints a zero.

The seventh position of the shift register 92 is selected to be a space, whereas the eighth, ninth, and 10th positions provide a null so far as the typewriter function, as such, is concerned. In the various space and null steps, however, other resetting, acknowledgment command and advance stepping switch signals and the like are provided.

For example, on the second step of the shift register, a line 108 is energized to create a read acknowledgment signal which is fed to the batching control and initiates a first aggregate batching cycle. The shift register line 108 is connected through the logic circuit of FIG. 5 and, in particular, as one input to a two-input gate 109 which has the second input connected directly to the output of the stepping switch control Nand-gate 95. This gate 95 is enabled and, as a result, the gate 109 is enabled, and transmits a logic 0 signal through an aggregate interlock gate 110 as a positive or logic 1 signal on a line 111 to the reed driver 104 of FIG. 6 of the output driver 16. The signal actuates the reed relay bank 105 to close a set of aggregate step contacts or switch 112 which are connected in the relay control circuitry of FIG. 3. A print acknowledge relay 113 in line L–3 is connected in series with switch 112. Energization of the print acknowledge relay 113 closes the various contacts to proceed with batching of the first aggregate and also enabling the reading of the asphalt tare. The relay 113 closes a set of contacts 113–1 in the aggregate relay circuitry, FIG. 1, such that the aggregate step switch advances and provides for the automatic feed of the first aggregate to the associated hopper 6. The relay 113 actuates a second set of contacts 113–2 in line L–5 of FIG. 3 to open the circuit and reset the aggregate control section 28. The resetting of relay 39 results in the closing of the associated contacts 39–2 in the asphalt control section 29 thereby conditioning the circuit for operation. The circuit is controlled by an asphalt logic relay 114 which is actuated by the asphalt stepping switch 24 as diagrammatically shown in FIG. 1. Thus, in this position, the asphalt stepping switch 24 has closed the contacts 114-1 in line L-8 such that the closure of contacts 39-2 energize the asphalt print control relay 115. The relay 115 is a timed relay as diagrammatically illustrated and after a predetermined time, closes a plurality of contacts including a set of normally open contacts 115-1 in L-11 to energize an asphalt transducer transfer relay 116 forming a part of the relay unit 26 in FIG. 1, to transfer the potentiometer transducer 2 of the asphalt scale unit into the printing circuit. Thus, relay 116 includes contacts 116-1 and 116-2 in circuit of FIG. 4 to transfer the circuit connection and a further set of contacts 116-3 and 116-4 transferring the power source connection to the transducer 2. Relay 115 also closes a set of normally open contacts 115-2 in line L-14 to again energize the logic control timing relay 56 to reinitiate or start an asphalt tare reading cycle, as subsequently described.

The shift register 92 further provides for stepping of the logic stepping switch 67 through the energization of a stepping switch line 117 in the last or 10th step position of the shift register 92, at which time the register resets. The line 117 is connected to the reed driver 104 in FIG. 6 and when energized closes the contacts 118 of the reed relay bank 105. The contacts 118 are connected in line L-16 of the relay circuit in FIG. 3 and control the energization of the stepping switch driver 69 to move the contact arm 68 from the first to the second contact and thereby change the logic output of FIG. 5.

The circuit further provides for resetting of the various counters, the interlocking flip-flops and the like either from an initial system reset and/or from a programmed reset under the control of the shift register and the logic control stepping switch. The counters in the illustrated embodiment of the invention are up-counters and are resettable by merely grounding of the reset lines. Thus, referring particularly to FIG. 5, a programmed reset is provided at each of the aggregate print step and includes a reset line 119 interconnected to the line 72 which is connected to the first contact 70 of the stepping switch 67. Line 119 is connected to a two-input gate 120, the second input of which is connected via a line 121 to the output of the gate 61a which, in turn, is controlled by the now closed contacts 39-4 of the aggregate print relay in line L-4 of FIG. 3. Thus, in the first aggregate tare position, and upon closing of the relay transfer contacts 39-4, the inputs to gate 120 are raised and a logic 0 is applied to a single-input gate 122, the logic 1 output of which is applied as a first input of a two-input reset gate 123. The second input of the gate 123 is connected via a print command line 124 directly to the print command signal line from the output side of the gate 61. Thus, when the print command is received and the gate 61 actuated by a signal at line 53 from the digital voltmeter 12, the gate 123 transmits a reset signal to a common signal reset line 125 to provide resetting of three counters. The common signal line 125 is connected to a net weight counter reset gate 126 having an output line 127 connected from FIG. 5 to the reset input of the net weight counter 15 in FIG. 4. An output line 127a also connects the output of gate 126 to the divide-by-10 counter 82 to reset it after each aggregate count. Similarly, a comparator counting reset gate 128 is connected to the reset line 125 and includes the line 129 interconnected to the reset point of the compare counter in FIG. 4.

A negative tare which looks the same digitally as a positive tare must be removed from the compare counter 13 to count from zero. Reset gate 128 includes a second input line 128a connected through a gate 128b, a gate 128c and a gate 128d to the polarity-sensitive network. Gate 128d has an input connected to gate 75 and a second input connected to line 72. Gate 128b has the first position shift register as an input to reset the compare counter 13 if the tare is negative. Further, the batch total counter reset gate 130 is also connected to line 125 with an output reset line 131 connected to the corresponding reset terminal of the batch total counter in FIG. 6.

Thus, the above reset circuitry establishes a programmed reset at the initiation of the aggregate printing cycle.

To insure proper operation and to automatically reset all of the counters in the event of a power failure, and when the printer system is turned on initially, a single-system reset line 132 is provided and connected through a gate 133 to a line 134 which is connected to the above reset gates 126, 128 and 130. The reset circuit similarly includes a truck total reset gate 135 connected to the system reset line 134 and having a reset line 136 connected to the truck total counter in FIG. 6. A daily total reset gate 137 is similarly connected to the reset line 132 and has its output line 138 connected to the daily total counter in FIG. 6. Line 134 is also connected to the tare asphalt storage flip-flop and the like as subsequently noted.

In addition, the net weight counter 15 only is reset after recording of the aggregate tare weight in the eighth position of the shift register by energizing of register line 139 shown in FIG. 4 and connected to the net weight counter gate reset 126 in FIG. 5 through a gated network. A two-input gate 140 has one input connected to the output of the aggregate control gate 95 via a line 141. The second input of gate 140 is connected to the shift register line 139 and thus resets the net weight counter after the aggregate tare reading. The next reading and printout will then be of the actual amount of the first aggregate delivered during the batch cycle.

In summary, initial energizing of the logic circuit in FIG. 5 results in system reset. Further, the transfer into an aggregate tare printing condition provides for automatic reset upon receipt of the print command. Further, after the printout of the aggregate tare weight, the net weight counter 15 is reset. However, the compare counter 13 is not reset and, consequently, at the next step when the first delivered aggregate material is read through the compare counter 13, it begins counting from the aggregate tare weight.

However, during the printout of the aggregate tare and before reading of the first aggregate, the asphalt tare has been read and stored in the printer unit as follows. Thus, as previously described in reference to FIG. 3, the print acknowledge relay 113 has deenergized at the initiation of the print out of the aggregate tare and as a result of energization of the asphalt logic relay 114, the asphalt timing relay 115 is energized. Relay 115 is provided with a predetermined time delay such that upon initial energizing of the circuit, the aggregate print relay 39 opens contacts 39-2 to prevent simultaneous setting of both circuits. After the timing period, the asphalt transfer relay 116 is energized as a result of contacts 115 closing. Relay 116 opens contacts 116-1 and 116-3 and closes contacts 116-2 and 116-4 to transfer and replace transducer 5 with the asphalt potentiometer transducer 2 into the circuit of the digital voltmeter 12, as shown in FIG. 4. The contacts 116-3 remove the zero-adjust resistor associated with the aggregate scale transducer 5 and insert contacts 116-4 which inserts zero adjust resistor 48 related to transducer 2.

As in the aggregate section, the asphalt control section 29 provides a separate transfer relay and a logic control relay 134 connected directly in parallel with the transfer relay 116. The relay 143 includes a first set of contacts 143-1 which are normally closed and connected in line L-5 of the aggregate control section to open that section and prevent simultaneous actuation of the aggregate and the asphalt control sections. The relay 143 includes a second set of contacts 143-2 in the logic circuit of FIG. 5 and, in particular, in controlling the connection to an asphalt interlock gate 145. The output of the gate 145 is connected as one input to a two-input gate 146, the output of which is connected to a single-input gate 147. The second input to the gate 146 is only employed in the subsequent sequence for asphalt weight recording and, consequently, is not here described.

The output of the gate 147 is connected to the input of a storage flip-flop 148 which functions to remember the receipt of the tare asphalt reading. The output of flip-flop 148 is connected into a tare readout system as hereinafter described. The output of the gate 147 is simultaneously applied to a three-input Nand-gate 149. A print command line 150 is connected as a second input from the output of the print command gate 61. An output line of the storage flip-flop 148 is connected as the third input. A gate 152 connects the output of the gate 149 to a polarity-storage flip-flop 153. The output of the three-input Nand-gate 149 is also connected to an asphalt tare store line 155 which interconnects the circuit of FIG. 5 to the comparing circuit of FIG. 4 and, in particular, provides an input via the line 155 to a pair of storage registers 156 and 157 shown immediately below the compare counter. The asphalt tare weight will normally never exceed the two least significant digits and, consequently, a single pair of storage means 156 and 157 is provided.

Upon energizing of relay 116, the analog signal of the asphalt scale potentiometer 2 is fed into the digital voltmeter 12 which resets and counts up to provide a digital signal to the output lines 50, least two significant digits of which are connected directly to the storage register and the digits transferred upon the enabling of the storage registers as a result of the signal via the enable line 155.

Referring again to the storage flip-flop 148 of the tare asphalt input, the output of the flip-flop is applied to a gating network including a first gate 158 having one input connected to the output of the storage flip-flop 148 and the second input connected in common to the input to the flip-flop 148 from the control gate 147 of the asphalt tare input circuitry. The output of the gate 158 is applied via a gate 159 to an asphalt interlock line 160 which, in turn, is interconnected to the reed driver 104 as shown in FIG. 6. The energizing of line 160 closes a set of contacts 161 in the reed relay. The contacts 161 are connected in line L-8 of the asphalt control section 29 of FIG. 3 to energize an acknowledgment relay 161a and thereby reset the circuit and provide an acknowledgment signal to the relay logic circuitry 114 of FIG. 1 similar to operation of relay 113 in the aggregate control section.

Thus, the asphalt tare is read and stored prior to the completion of the aggregate tare readout and the completion of the first aggregate obtained.

Upon completion of the aggregate-weighing cycle, the batch control relay logic 37 again closes the associated contacts 37-1, completing the energization of the aggregate control section 28. At this time, the stepping switch unit 67 has been moved to the second position with the contact arm 68 now engaging the first aggregate contact 162.

It should be noted that in the illustrated embodiment of the invention, five different aggregates and a mineral feed are provided for in sequence and the separate step switch contacts are connected such that each provides the same circuit operation, as follows.

The contact 162 is connected to a source 163 and a gate 164 and upon engagement of the contact arm 68, the gate input is grounded. The output line 165 of the gate 164 is connected as an input to the gate 166 for controlling of the clock 62. The output of the gate 166 is connected via a line 167 directly to the clock gate line 66. The second input to the gate 166 is controlled by a pair of interconnected flip-flop circuits 169 and 170 which function to provide a comparison check during the aggregate weighing cycle between the number in the compare counter 13 and the output number of the digital voltmeter 12. This is required particularly with an up-type counter where the comparison is made by counting up to the number. The compare counter 13 cannot be at a value greater than the digital voltmeter 12. If it were, when the compare counter 13 began to count, it would have to count to overflow and then start recounting before it would equal the digital output and thus produce an abnormally erroneous reading. Thus, in accordance with the illustrated embodiment of the invention, when the number is placed into the digital voltmeter 12 and in response to the initiation from the external trigger command, the digital output goes to zero and starts to count upwardly. It must go to one count higher than the reading from the compare counter 13 to comparator 14 in order to produce comparison output signals at comparator lines 78 and 79 which are connected to the input of the gate 77 for controlling of clock input line 65. The output of the gate 77 is connected as an input via a line 171 to both flip-flop circuits 169 and 170. Although a single circuit may be employed, the pair of flip-flop circuits 169 and 170 provide noise protection and the like. A gate 172 connects the line 171 as an input to the control flip-flop 170. The interlocking and stabilizing flip-flop 169 is connected directly to the line 171. A pair of opposite polarity level output control lines 173 of gate 169 are connected as inputs to the second flip-flop 170. The input to the flip-flop 169 results in the top output line 173 going to the logic 1. This conditions the circuit 170 for operation which must receive a signal via the gate 172 which rises to a logic 1 and returns to zero in order to transfer a zero signal into the gate 166. Then, and only then, will the line 167 produce a logic 1 to the clock gate line 66.

In the aggregate tare and asphalt weight print positions, the output of the gate 165 is a zero and gate 166 is set to provide an enable signal on line 167 because this feature is not needed or desired at these times. This insures in the aggregate weight positions, that the digital voltmeter 12 has counted past the reading on the compare counter 13 before the clock 62 is enabled and clock pulses are sent to the compare counter 13. A maximum error which might be introduced is a single count which would be insignificant compared to the tremendous error which would be recorded if the compare counter was driven to overcount.

Assuming the above condition has been established, the three input lines 64-66 to the clock 62 will all now be at a logic 1 level and the clock 62 is enabled to transmit pulses to the compare counter 13 and the net weight counter 15 in the same manner as heretofore described. As previously noted, the net weight counter 15 has been reset whereas the compare counter 13 will be driven from the tare weight to provide a true comparison between the additional material added while the count applied to the net weight counter 15 will correspond to the actual weight of the first aggregate material added.

Further, during this period, it is desired to accumulate the net weight of the material in the several other counters including the batch total counter 17, the truck total counter 18 and the daily total counter 19. The counters 17-19 are coupled to the clock for receipt of count signals in the second position through a totalizing clock line 175 shown connected to the clock pulse line 62a from clock 62 to the synchronizing flip-flop 60. The clock line 175 is connected to a four-input Nand-gate 176. A bypass gate 177 is connected to the aggregate tare line 72 to disable the four-input Nand-gate 176 during the aggregate tare recording and printing. The other two inputs are connected respectively in parallel to the input gate lines 64 and 65. The circuit will enable after the aggregate tare readout and the establishment of logic ones at the line 64 and 65. This occurs upon the enabling of the clock 62 to transmit the aggregate weight material to the aggregate counting circuitry. The output of the gate 176 is connected to a bank of individual gates 178 for individually distributing in parallel the count to batch total line 179, a truck total line 180 and a daily total line 181, all of which are interconnected to the corresponding counters as shown in FIG. 6. Thus, the weight of the first aggregate material is recorded in the several counters. The shift register 92 is now actuated in the same manner as that related to the aggregate tare cycle to sequence the circuit and transfer the printout into the Teletype 11 for recording in the first aggregate position on the ticket 11.

The ticket 11 is divided into equal parallel columns. The ticket 11 is mounted in the Teletype unit such that each division relates to the control of the shift register 92 to locate the number to the right edge of the column with the least significant digit immediately adjacent the right edge as a result of the printing in the sixth shift position of the shift register 92. Step 7 provides for spacing within the Teletype unit to move the type wheel into the next column. Positions 8, 9 and 10 provide for pure null positioning to permit the other interlocking functions or other movements such as carriage return, and line feed or form-out within the Teletype unit. Upon initiation of the first aggregate material print cycle, the initial zero position of the shift register is in null. The first and second position provide for spacing from the left edge and also provide the feedback signal to permit the feeding of the second aggregate. The third, fourth, fifth and sixth positions provide for printout, with the seventh position providing a space and positions 8, 9 and 10 providing a subsequent null to align the typewriter with the first position in the next column.

At the beginning of each aggregate print, the digital level comparison flip-flops 169 and 170 are reset by raising and lowering their reset lines. A reset gate 182 is a two-input gate having one side connected directly to the line from the stepping switch circuit. The second input is interconnected to the first position shift register line 102 and is thus enabled at the first step. The output of the gate 182 is connected in common to reset the two flip-flops 169 and 170. During the next aggregate read cycle, the flip-flops 169 and 170 again require a comparator output 77 to insure that the voltmeter is at a level greater than that set in the compare counter 13. At the end of each aggregate delivery, the net weight counter 15 and the divide-by-10 counter 82 are reset such that the subsequent reading in the net weight counter is the difference of the previous inputs of the aggregate tare or prior aggregate feeds.

The automatic control thus moves through the several aggregate delivery steps, with stepping switch 67 progressing one step with each deliver.

The aggregate batch control and the readout unit continue to cycle with alternate sequential actuation and with the aggregate batch control being triggered during the early portion of each printout to reinitiate delivery of the subsequent aggregate until all of the desired aggregate materials have been delivered and the slight mineral fill desired has been delivered.

Upon the seventh step, it moves into and grounds the contact 185 which constitutes an asphalt tare printout contact. The asphalt tare has been recorded and stored in the registers 156 and 157 associated with the counter 13. Grounding of contact 185 actuates the stored logic circuitry to transfer the stored digits into the counter 13 such that the asphalt weight count will be from the tare weight. The transfer of the stored digits into the printout unit to provide a record of asphalt tare is as follows.

An asphalt tare enabling gate 186 is connected by a line 187 to the contact 185. The output of the gate 186 is connected via lines 188 and 189 to a two-input gate 190, the opposite side of which is connected to the polarity-storage flip-flop 153. A single-input gate 191 is connected to the output of the gate 190 and provides an asphalt tare print enable line 192 which is interconnected into the circuit of FIG. 4 to transfer the stored numbers from the storage registers 156 and 157 to the printout system. Thus, the enable line 192 is connected to control gate 193 connecting the shift register lines 91 associated with the fifth and sixth position of the shift register 92 for transfer of the stored numbers. Thus, the output of gate 193 is connected to transfer gates 194 interconnecting the registers 156 and 157 and a set of printout lines 195 which are interconnected into the printing circuit of FIG. 6. The lines 195 are connected as inputs to a plurality of AND-gates 196, the output of which is connected to the buffer driver nodes of buffer driver 103 for transfer of the asphalt tare to the Teletype unit 11. As with the aggregate tare, only the two least significant digits are actually provided with a printed number. In the illustrated embodiment of the invention, it is assumed that there is no asphalt tare, and, consequently, two zeros are printed.

Simultaneously, with the print transfer of the numbers, the tare in storage register 156 and 157 is placed into the compare counter 13 such that the asphalt tare weight is counted from the tare value. A data strobe gate 197 shown adjacent the gate 190 in FIG. 5 has one side connected directly to the output of the polarity-storage flip-flop 153. The opposite input is connected through a pair of coupling gates 198 to the asphalt enable line 189. A second input to the first of gates 198 is provided from the shift register via the line 199. In the illustrated embodiment of the invention, the line 199 is associated with the third position of the shift register 92 and thus is connected to the corresponding line 91. The output of the data strobe gate 197 is connected via a line 200 to the compare counter 13 as shown in FIG. 4. When a negative going pulse signal is applied to the line 200, the counter 13 is actuated to transfer the numbers from the storage registers via a set of lines 201 into the compare counter.

Referring to FIG. 5, a signal is also transmitted via a line 202 from the contact 185 and associated line 187 to a gate 203 which is interlocked to the tare asphalt remember flip-flop 148. The gate 203 is connected via a control line 204 to the second-position control line 91 of the shift register 92 and is thereby actuated in the second position of the shift register. The output of the gate 203 is connected as an input to the asphalt interlock gate 159, the other input of which is connected to the gate 158 and established during the asphalt tare reading. When line 204 is enabled, the gate 203 inserts a logic 0 to the final transfer gate 159. A zero is established as a result of the memory circuit at the first-described input and, consequently, a positive pulse signal is transferred via the asphalt interlock lead 160 to the reed relay driver 104 in FIG. 6. This, in turn, results in an actuation of the related contacts 161 of the reed relay unit 105 and the consequent energization of the asphalt relay circuitry.

The shift register 92 is started to record the asphalt tare through a gate 206 in FIG. 5 having one side connected through a gate 207 to the output of the asphalt tare gate 186 connected to contact 185 of the stepping switch unit 67. The output of gate 206 is interconnected to a gate 208, the output of which is a register start line 209 connected to the shift register 92 and generally in parallel with the previously described start line 98 employed for aggregate tare and net weight printout. The shift register 92 cycles providing the desired spacing and printing in the two least significant digit positions of the asphalt tare reading. During the subsequent steps, the shift register resets and operates the stepping switch 67 generally in accordance with the previous description to move into engagement with the next contact 210 which establishes an asphalt material read and print cycle.

The net weight counter 15 and the compare counter 13 were reset at the beginning of the asphalt tare print position of register 92 from the circuit of step switch contact 185. The signal transmitted via the line 187, gate 186 and line 188 is connected to a gate 211 having a second input connected to a gate register line 212 which is connected to the first position line 102 of the shift register 92. The output of gate 211 is applied to the net weight counter reset gate 126 and to the compare counter reset gate 128, which are thus reset prior to the readout of the tare weight to clear the aggregate material inputs to the two counters and to thereby condition the circuit to have the asphalt tare set in the compare counter 13 if positive.

The system sequences basically in the manner of the first aggregate material, terminating with the asphalt weight being printed out from the net weight counter 15. Thus, the contact arm 68 moves into engagement with contact 210, grounding the input signal into the Nand-gate 95 for controlling and establishing the enable net weight line 94, thereby enabling the net weight counter 15. An interlocking gate 213 is also connected to the contact 210 providing a signal into a gate 214. A second input to gate 214 is interconnected to the output gate 145 of the asphalt scale control contacts 143-2, the output of which is connected as a secondary input to another gate 61a which provides the input signal to the clock synchronizing flip-flop 59.

This enables clock 62 and provides a readout in accordance with the previously described operation of the first aggregate material.

The asphalt weight contact 210 is further connected to the asphalt scale controlled gate 146 and also via a line 215 in parallel to gate 216 and aggregate count gate 83. Gate 83 is held off to prevent transmission from the divide-by-10 counter 82 via the previously described aggregate count path. Gate 216 is connected to a gate 217, having a second input connected to the clock line 81. The output of gate 217 is connected to gate 84 and transmits the clock pulses therethrough to the clock output line 85 which, as previously described, is connected to the compare counter 13. Thus, the asphalt weight is read directly to the least significant digit and the divide counter 82 is bypassed. The device then cycles to print out the asphalt weight of material with a final resetting of the net weight counter 15 and the actuation of the stepping switch 67 to the final position at which the contact arm 68 engages a batch total contact 218 establishing a signal to enable the batch total counter 17 for readout. The contact 218 is connected via a gate 219 to enable batch total line 220 which is connected to a gate bank 221 having a set of shift register lines 222 connected to the shift register lines 91 and 108 to permit readout to five significant digits. The output of the gate bank 221 is connected to buffer driver 103 for transmission of the stored batch total. The shift register 92 is actuated from contact 218 which is connected to the gate 206 to provide a signal through gate 208 to the alternate shift register start line 209 in FIG. 5 which is connected to the shift register 92 in FIG. 4 to initiate operation of the Teletype unit to transfer the batch total from the batch total counter 17 to the ticket, generally in the same manner as heretofore described.

At the end of the batch total printout, the step switch 67 is stepped to the home position and all of the counters except truck total counter 18 and the daily total counter 19 are reset. The batch control 8 then establishes a signal to recycle for another batch or an alternative signal is given to finish the tickets 11. Thus, successive batches can be sequentially delivered and recorded until the batching logic control indicates that the last batch for that load has been weighed and delivered at which time the finish ticket signal is issued from the control unit.

The finish ticket signal includes closure of a switch 224 at line L-21 of the relay circuit shown in FIG. 3 and actuates the printer through a preprogrammed sequence control to print, immediately below the last batch line, the truck total which is the summation of the several batch totals, the daily total to that point in time, the time at which the finished ticket has been printed and finally the date.

Switch 224 is connected in series with the now closed automatic relay contacts 35-3, a set of normally open stepping switch contacts 226 which are closed in the switch home position and a finish ticket relay 225. This relay controls normally closed contacts 225-1 connecting the first level of the stepping switch 67 to the ground line and a normally open contact 225-2 connecting a second level of the stepping switch to ground. The second level includes a contact arm 227 sequentially engaging a series of contacts, the first of which is a truck total printout contact 228. In FIG. 3, relay 225 further closes a set of batch contacts 225-3 in line L-23 which in series with now closed relay contacts 35-4 of relay 35 in line L-22 bypass switch 226 and hold relay 225 energized.

Closure of contacts 225-2 also directly grounds a control line 229 which is connected to the gate 206 and maintains a cycle signal on the shift register start line 209 for directly initiating a cycle of shift register 92.

In the first or home position, the grounded contact 227 is connected to a gate 230 which enables a truck total counter enable line 231 which is connected to the truck total gate bank 212 which couples the truck total counter 18 to the printout system under the control of the shift register 92 in the same general manner as heretofore described.

The truck total line 231 is also connected through logic, not shown, to typewriter controls 231a to insert a comma in the total number and provide desired functions of the typewriter. Thus, the line 231 is connected to a comma control gate 233. The output line 234 is connected to the buffer driver 103 through a general purpose AND-gate bank 196 in FIG. 6. The gate 233 includes a second shift register input line 236 connected to the third-position shift register line 91. Thus, in the truck total printout, the relay bank is energized to type the most significant digit during the first shift register position through connection of the shift register line 102 to the truck total gate bank 232. The second shift position prints the next significant digit. The third shift position enables the gate 233 and a comma is printed after which the last three significant digits are printed in sequence, during the fourth, fifth and sixth shift register positions. In the seventh and eighth positions, the Teletype unit spaces and during the ninth and 10th positions, nulls and operates the stepping switch 67 to the second position, engaging a daily total contact 237. The typewriter null control in the first position includes a logic network including a gate 238 connected to line 231 and through a gate 239 to the ninth and 10th position lines of the shift register 92 by leads 240. The output of gate 238 is connected to a typewriter null line 241 connected to the driver system. The null line is also controlled by a pair of paralleled gates 242 and 243 having corresponding inputs connected to line 229. The second input of gate 242 is connected to gate 239 and the second input of gate 243 is connected to the eighth position shift register line via a lead 244.

The shift register cycles and upon resetting, actuates the step switch contacts in line L-16 to drive the step switch unit 67 to the second position, in which position the contact arm 227 engages and grounds a contact 245 to enable and establish a daily total readout from the daily total counter 19. Contact 245 is connected to ground the input to a Nand-gate 246, the output of which is connected to a daily total enable line 247. This enables the daily counter shown in FIG. 6 which has a bank of five shift register lines 248 interconnected to the appropriate shift register lines to print out the daily total.

In the illustrated embodiment of the invention, the first position of the shift register results in printing the most significant daily total digit and therefore printing of a "1" if the total has accumulated to the million pound level or a space if it has not. The second position, as shown on the ticket 11, prints a comma or spaces, depending upon whether a number is printed in the first position. The next three positions print the three next significant digits beginning with the most significant. In the sixth shift register position, a comma is printed and during the next three positions, the last three daily counter digits are printed with the final shift register position providing a null and the driving of the stepping switch unit 67 to the third position.

Referring again particularly to FIG. 5, in the second position during which time the daily total is transferred, the output daily total line 247 is also connected to a comma logic circuit 249 having a comma enable output line 250 connected to the typewriter system under the control of a pair of control lines 251 connected to the corresponding second and sixth position register lines. As the logic is similar to that heretofore described, no further detailed description thereof is given.

Further, in the second position, the contact 245 is connected directly to a truck total reset line 252 which is connected directly as an input to the reset gate 135 for the truck total counter. During the previous cycle, the truck total has been printed on the ticket 11 and upon initiation of the daily total, the truck total counter may be reset.

Figure 2:
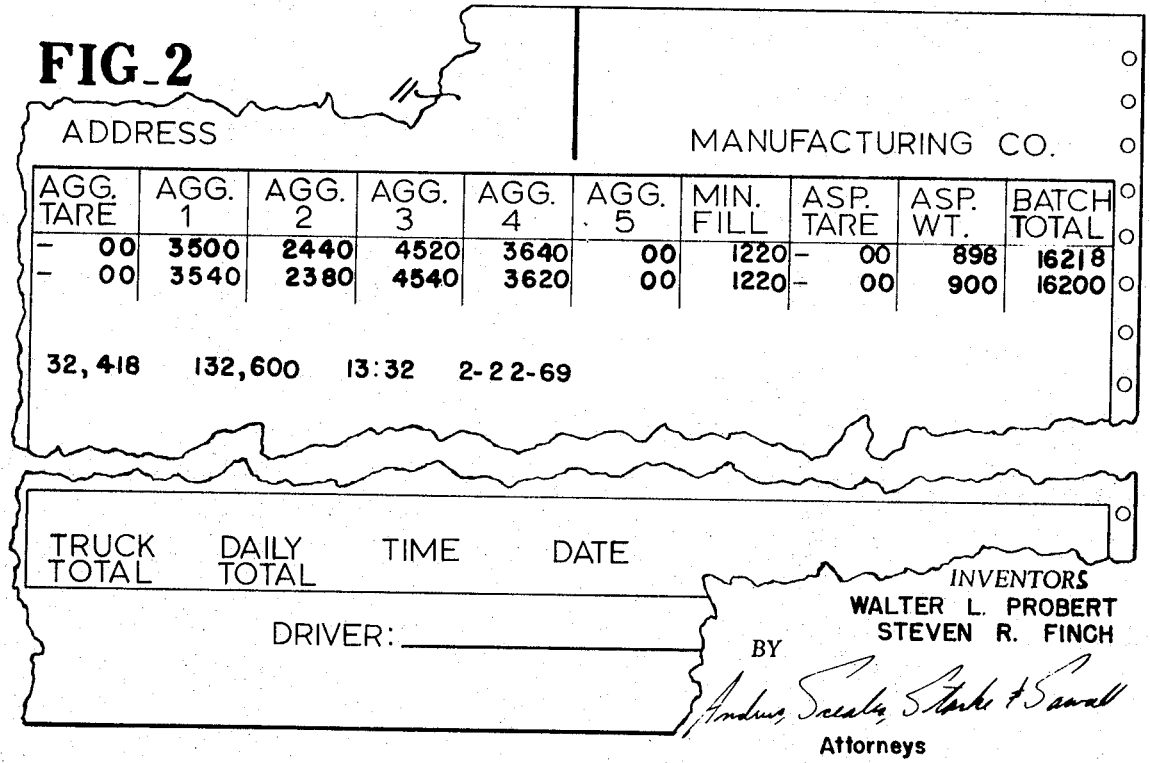
FIG. 2 is a diagrammatic illustration of an output ticket obtained with the system of FIG. 1.

The completion of the readout of the daily total results in repositioning of the typewriter with respect to the ticket 11 to print the time as shown in FIG. 2. Thus, the stepping switch 67 is automatically driven to a third contact 253, which is connected to a gate 254 having a time enable output line 255. The time unit 21 is also connected to the shift register control lines by a bank of lines 256. In the illustrated embodiment of the invention, the lines are interconnected to the third, fourth, sixth and seventh shift register lines. The first two positions of the shift register provide for spacing followed by the printing of the hour. The fifth position directly enables printing of a colon through the interconnection of the enable time line 255 to a colon logic network 257 which has an input control line 258 connected to the corresponding fifth position register line.

The colon enable line 259 from network 257 is connected to the ANDegate system 196 of FIG. 6 to provide for corresponding printing of the colon between the hour and the minutes. After printing of the colon, the sixth and seventh positions print the minutes. Shift register positions 8, 9 and 10 space the typewriter. This results in further recycling of the shift register and stepping of the stepping switch unit 67 to the fourth contact 260, which forms a date-printing contact.

The contact 260 is connected as an input to a Nand-gate 261, having an output line 262 connected to enable the date register 20, as shown in FIG. 6. The date register 20 is also provided with a bank of sequence transfer lines 263 connected to appropriate shift register control lines to print the month, day and year as shown in FIG. 2, In the illustrated embodiment of the invention, the first position of the shift register enables the register 20 to print the number "1" or space, depending upon the first most significant digit for the month of the year. The second position prints the appropriate digit for the month. The third position prints a hyphen while the fourth and fifth positions print the two digits for the day. The sixth position prints a hyphen and the seventh and eighth positions print the digits for the year.

During the ninth position of the shift register, a logic circuitry, shown in block diagram 263, provides for enabling of an automatic carriage return line 264, a form-out line 265, and the like to complete the printing of the ticket and reestablishing of the control circuit. A signal is also transmitted via a line 266 to the shift register drive logic control to turn off the signal at the enable line 209 and thereby complete the operating cycle.

Energizing of form-out line 265 automatically advances the ticket 11 and locates a subsequent ticket 11 within the typewriter from a suitable source.

To reset the circuit, the finish ticket relay 225 of FIG. 3 controls a third set of normally open contacts 225-3 in line L-19, and upon energization, closes such contacts. The contacts 225-5 are connected in series with a normally open switch 267 of a further level of the stepping switch unit, and a timing relay 268. The switch 267 is held closed after the printing of the date. The relay 268 is, thereby, energized and after a predetermined time, closes a set of contacts 268-1 in line L-20 to energize a relay 269 closes a set of latching contacts 269-1 to bypass the timing relay contacts and simultaneously opens a set of contacts 269-2 to reset the stepping switch level transferring relay 225 to thereby reset the stepping switch connections to the normal condition shown in FIG. 5. This prevents recycling of the finish ticket printing in event that the switch 224 remains closed.

In addition to the above cycling, the automatic batch control may call for skipping of the feed of a particular medium or the skipping of the recording of the particular delivery through actuation of a skip relay 271 which is diagrammatically shown in FIG. 1. The skip relay controls two sets of contacts interconnected to control a logic control skip relay 270 in line L-6 of FIG. 3. Thus, the relay 271 includes a set of normally open contacts 271-1 which close to energize relay 270 to simultaneously open a set of contacts 271-2 to deenergize the normal aggregate drive relay circuit. The energization of the relay 270 first results in the opening of a set of contacts 270-1 to positively prevent operation of the tare control readout section. Simultaneously, relay 270 closes a set of normally open contacts 270-2 connected directly to the shift register enable line 98 to ground the enable line and thereby immediately establish a cycle of the shift register during which the net weight counter, having been reset, will print out zeros. The automatic transfer of the system to the next delivery cycle in response to establishment of the shift register acknowledgment signal is as previously described.

The present invention also may provide for a manual override control through the provision of a suitable manual control switch interconnected through the relay circuit in FIG. 3 to provide the desired sequencing. As such circuitry can be readily provided by those skilled in the art, the particular circuitry illustrated is not described in detail. Generally, the main printer control switch 31 includes additional interlocking switch 272 connected to line L-17 and connected to control the stepping switch through interlocking stepping switch contacts 273 and 274. Similarly, a normally open switch 275 is connected in circuit through a set of normally open contacts 225-4 of finish ticket relay 225 in parallel with the switch 272. A further normally open bypass switch 276 is connected in parallel with the switch 275 and the switch 273. The switches 273 and 276 provide a complete circuit through the switch 275 or, alternatively, independently thereof. Generally, switch 273 is closed during the first three aggregate delivery positions as well as the daily total, the time and the date recording. The switch 276 is closed at the other times in the cycle. An additional manual control switch 276 is connected in circuit to control the energization of the relay 225. The switch 276 is connected in line L-23 and in series with a normally open finish ticket manually operated switch 277 to selectively permit manual energization of relay 225.

The aggregate printout and asphalt printout are provided with separate manually operable switches 278 and 279 respectively in lines L-5 and L-9. The switches 278 and 279 are connected in circuit through normally closed automatic control relay contacts 35-5 and 35-5 respectively under the control of the automatic control relay 35 in line L-2. This relay is only energized in the automatic position. The switch 278 may be ganged to or a separate switch 280 may be provided as shown at line L-7.

The illustrated embodiment of the invention is shown in FIG. 1 with an automatic ticket addressing unit 281 attached to the Teletype unit 10 and adapted to receive a punched tape 282 which provides automatic drive to insert a related address. The system is preferably provided with a suitable interlock to prevent operation of the batching circuit during the addressing of ticket 11.

The illustrated embodiment particularly disclosed circuit control to establish a number readout with appropriate commas, colons and the like. If desired, a printout unit having letters may be employed and through logic circuits selectively enabled to print identifying letters, words or the like, The system of the present invention thus provides highly improved means to selectively record the operation of a batching system. The system particularly provides a highly flexible control which can be readily adapted to provide the desired setting and resetting of the counting or recording means. Thus the system may or may not establish compensation for tare, and the delivery of the material may selectively record as net weights, accumulative weights and the like, as desired.

Various modes of carrying out the invention are contemplated as being within the scope of the following claims which particularly point out and distinctly claim the subject matter which is regarded as the invention.

1. A batch process readout system for automatically recording the delivery of material to a receiving means, comprising measuring means to establish a signal proportional to each material delivered to the receiving means, a batching control means establishing a related signal proportional to the desired material to be delivered to said measuring means, a readout means, control means selectively connecting said measuring means to said batching control means and to said readout means and including first transfer means responsive to a comparison of said signals to indicate a completion of a measuring cycle with said measuring means connected to said batching control means to connect said measuring means to the readout means and second transfer means responsive to selected operation of the readout means to connect said measuring means to the batching control means, wherein said readout means includes a sequentially activated printout means, a resettable multiple digit number storage means connected to said measuring means, printout control means to connect said storage means to said printout means to said sequentially transmit the stored number digits to the printout means, and said second transfer means being responsive to operation of the printout control means.

2. The batch process readout system of claim 1 wherein said measuring means includes a voltage signal source having an output means establishing said signal proportional to each material delivery, said voltage signal source having a voltage input means, said readout means including an analog to digital converter having a power supply, said first transfer means connecting said voltage input means to said power supply and the output means to the converter.

3. The batch process readout system of claim 2 having said voltage signal source energized to establish a selected voltage signal for a zero material delivered and thereby establishing an apparent zero offset of the zero delivered position of the source from the normal zero output signal of the signal source.

4. The batch process readout system in claim 1 wherein the measuring means is a weighing scale means having a precision potentiometer set in accordance with the scale reading to establish a voltage signal proportional to the material in the scale means, said readout means including an analog-to-digital converter, said first and second transfer means including switch means connecting said measuring means to the converter of said readout means and to the batching control means, and said readout means having digital counting means to read the converter and to selectively transfer the number into a plurality of storage counters and means to sequentially and selectively read out the numbers in the storage counters and reset said counters during each batch.

5. The batch process readout system of claim 4 wherein said readout means includes a sequentially activated character-typing means and said plurality of counters being resettable multiple digit number storage counters, a digital comparator having a first input connected to said converter, a counting means connected to a second input to said comparator, said counting means being simultaneously connected to said storage counters, printout control means selectively connecting said counters to said typing means to sequentially record the stored number digits on a removable ticket, and means to reset the storage counters after transfer of the stored number to the ticket.

6. The batch process readout system of claim 5 wherein said typing means includes a plurality of selectively enabled control lines, and said printout control means connected to sequentially enable said lines.

7. The batch process readout system of claim 1 wherein said measuring means includes a tare component signal means and the signal is proportional to the summation of the tare and material in the measuring means, said control means including polarity sensitive means connected to said measuring means by said first transfer means and establishing a first polarity output in response to a positive tare and a second different polarity output in response to a negative tare, and selection means connected to the polarity-sensitive and to the readout means to control the readout of said tare component.

8. The batch process readout system of claim 7 wherein said readout means includes resettable multiple digit number storage means connected to said measuring means, and said polarity-sensitive means operatively connects said storage means to said measuring means to insert the tare component in said storage means only in response to the first polarity output.

9. The batch process readout system of claim 1 wherein said readout means includes counting means and printout means, and said measuring means having a first and a second weighing means associated with corresponding receiving means for separately measuring different material employed in a process, each of said weighing means having an associated signal transducer means with an output proportional to the tare weight of the weighing means and the weight of the material therein, said first transfer means including means to sequentially connect said signal transducers to the counting means of the readout means with the second transducer connected to temporary storage means to maintain a tare record in the readout means during a plurality of recorded deliveries to the first weighing means, and means responsive to the last of said plurality of recorded deliveries to connect said storage means to said printout means.

10. The batch process readout system of claim 1 for an asphalt batching plant wherein said readout means includes teletype printout means adapted to releasably receive a ticket and to type information thereon, an asphalt weighing means for separately measuring the asphalt and a second weighing means for sequentially measuring and accumulating a plurality of aggregate materials, each of said weighing means having an associated analog signal transducer means with an output proportional to the summation of the tare weight of the weighing means and the weight of the material therein, a counting means, a plurality of storage counters selectively connected to said counting means, said transfer means including means to sequentially connect said signal transducers to the counting means to readout the weight of material in the corresponding weighing means, and means responsive to the last of a plurality of material deliveries to connect said storage means to said teletype printout means and to reset selected counters.

11. A batch process readout system for recording the multiple delivery of materials, comprising a batching control means including a receiving means for automatically delivering and measuring predetermined material amounts, a measuring means connected to said batching control means and establishing a digital encoded signal proportional to the measured material delivered to the receiving means, a digital counting means, a digital number comparator, and control means selectively connecting said comparator to said measuring means and to said digital counting means, said comparator having an output means establishing an output signal related to a preselected comparison to terminate operation of said counting means, and recording means selectively connected to said counting means to establish selected records of the numbers presented to said comparator by said counting means.

12. The batch process readout system of claim 11 wherein said measuring means has an analog signal voltage means, and an analog-to-digital converter connected to said analog signal voltage means.

13. The batch process readout system of claim 11 having a sequentially actuated printout means to print out information on a ticket as a series of interrelated characters including numbers, letters and punctuation characters, said control means including a logic control and sequencing means connected to said printout means and to said recording means to control the sequential transfer of the measured material information to said ticket.

14. The batch process readout system of claim 12 wherein said measuring means is alternately connected to the batching control means for establishing said signal proportional to the material delivered to the receiving means and connected to the digital number comparator.

15. The batch process readout system of claim 11 wherein said measuring means includes an analog input means connected to said batching control means and an analog-to-digital converter counting from zero to the analog input at said analog input means, said comparator having an output means establishing an output signal related to a preselected comparison of the count in said converter and said digital counting means and including the interlock means coupled to said counting means to disable the counting means with the converter at a count below that in the comparator.

16. The batch process readout system of claim 11 wherein said receiving means includes weighing means to measure the material delivered, said weighing means having a tare weight, said recording means including a plurality of resettable counters each having a reset input means, a reset means connected to said reset input means, and sequencing means connecting said plurality of counters to said counting means and to said reset means, said control means including means to record said tare weight prior to the delivery of material to said weighing means.

17. The batch process readout system of claim 11 wherein said receiving means includes a pair of weighing means to measure different materials, said weighing means each having a tare weight, a storage means for storing numerical data, said recording means including a compare counter, and a logic control means having sequencing means connecting said first weighing means to said comparator and actuating said compare counter to insert the tare weight in the comparator, and the second weighing means to the storage means to store said second tare weight for subsequent readout.

18. The batch process readout system of claim 17 wherein said logic control means includes polarity-sensitive means having a first polarity output related to a positive tare weight, and a second polarity output related to a negative tare weight, and interlock means connected to said polarity-sensitive means and controlling the connection of said compare counters to said counting means.

19. The batch process readout system of claim 11 wherein said measuring means includes a first batch weighing means for the material and having a precision potentiometer establishing an analog signal proportional to the measured material with a zero setting offset from the measuring means apparent zero, said measuring means including an analog-to-digital converter having an analog input means and a digital number output means, a transfer switch having a first position connecting said potentiometer to said batching control means and a second position connecting said potentiometer to said digital converter, and said digital converter including an operating power supply connected by said switch means to energize said potentiometer in said second position to establish an offset zero position.

20. The batch process readout system of claim 11 for mixing of a first material with a plurality of similar second materials wherein said measuring means includes first batch weighing means for the first material and having a first analog signal means establishing an analog signal proportional to the measured first material, a second batch weighing means for the second materials and having a second analog signal means establishing an analog signal proportional to the received second materials, said measuring means including an analog-to-digital converter having an analog input means and a digital number output means, said converter establishing the digital output number by counting up to the analog signal, a pair of transfer switch means, one for each signal means and each having a first position connecting said analog signal means to said batching control and a second position connecting said analog signal means to said converter, said digital converter including an operating power supply connected by said switch means to energize said signal means in said second position, said digital counting means including a counting clock means and a compare up-counter driven by said signals from said clock means, a readout control means having a transfer switch operating means including interlocking means actuated by said batching control means to sequentially connect said signal means to said digital converter and responsive to selected operation of said recording means to reconnect said signal means to said weighing means, said readout control means including a sequencing switch means to selectively actuate said recording means to sequentially record the delivery of said materials.

21. The batch process readout system of claim 20 wherein said recording means includes a net weight up-counter and totalizing up-counters, said up-counters having means for resetting said up-counters to an initial count position, and said sequencing switch means includes means selectively controlling the connection of said net weight up-counter and said totalizing up-counters to the counting means and then resetting said up-counters.

22. The batch process readout system of claim 11 for mixing of a first material with a plurality of similar second materials wherein said measuring means includes first batch weighing means for the first material and having a precision potentiometer establishing an analog signal proportional to the measured first material with a zero setting offset from the measuring means apparent zero, a second batch weighing means for the second materials and having a second precision potentiometer establishing an analog signal proportional to the received second materials, said measuring means including an analog-to-digital converter having an analog input means and a digital number output means, a pair of transfer switch means, one for each signal means and each having a first position connecting said potentiometers to said batching control means and a second position connecting said potentiometers to said converter, said digital converter including an operating power supply connected by said switch means to energize said potentiometers in said second position with said offset zero position, said digital counting means including a counting clock means and a compare up-counter driven by said signals from said clock means, said recording means includes a net weight counter and a plurality of totalizing counters, a readout control means having a transfer switch operating means including interlocking means actuated by said batching control to sequentially connect said potentiometers to said digital converter and responsive to selected operation of said recording means to reconnect said potentiometers to said weighing means, said readout control means including a sequencing switch means to selectively connect said clock means to said net weight counter and to said totalizing counters and to reset the net weight counter after each delivery of material to the measuring means, means to record the net weight counter reading prior to resetting thereof and thereby establish a record of the individual deliveries and to subsequently record the totalizing counters to establish a record of the summations of selected deliveries, and means to reset said totalizing counters.

23. The batch process readout system of claim 11 wherein said digital counting means includes a counting clock means and a compare counter driven by said signals from said clock means, a net weight counter, at least one totalizing counter, and logic control means connected to actuate said counting clock means and simultaneously connect said compare counter and the net weight counter and the totalizing counter to the clock means to record each material delivery and to reset the net weight counter after each individual delivery.

24. The batch process readout system of claim 11 wherein said recording means includes a plurality of information counters, and said digital counting means includes a compare counter and a clock pulse means having an input control gate, said control means including a sequence stopping switch for selectively enabling said control gate and selectively connecting said clock pulse means to said compare counter and to said information counters.

25. The batch process readout system of claim 24 having means to connect the comparator to said control gate to prevent operation of the clock pulse means in response to a larger count in the measuring means than in said compare counter.

UNITED STATES PATENT OFFICE
CERTIFICATE OF CORRECTION

Patent No. 3,614,397                     Dated October 19, 1971

Inventor(s) Walter L. Probert and Steven R. Finch

It is certified that error appears in the above-identified patent and that said Letters Patent are hereby corrected as shown below:

Column 1, Line 18,  cancel "formulas" and substitute --- formulae ---;

Column 4, Line 37,  cancel "readout" and substitute --- read ---;

Column 5, Line 27,  cancel "readout" and substitute --- read ---;

Line 51,  cancel "count" and substitute --- counter ---;

Line 56,  delete the "hyphen (-)" between "line-type";

Line 59,  cancel "with" at the end of the line and substitute --- the ---;

-1-

UNITED STATES PATENT OFFICE
CERTIFICATE OF CORRECTION

Patent No. 3,614,397        Dated October 19, 1971

Inventor(s) Walter L. Probert and Steven R. Finch

It is certified that error appears in the above-identified patent and that said Letters Patent are hereby corrected as shown below:

(Continued)

Column 8, Line 3, after "arm" cancel "of" and substitute --- or ---;

Line 26, cancel "76" after "gate" and substitute --- 75 ---;

Line 62, cancel "divided-by-10" and substitute --- divide-by-10 ---;

Column 10, Line 44, cancel "10th" and substitute --- tenth ---;

Column 11, Line 23, cancel "10th" and substitute --- tenth ---;

Column 17, Line 66, cancel "212" and substitute --- 232 ---; and at the end of the line cancel "prin-" and substitute --- print ---;

UNITED STATES PATENT OFFICE
CERTIFICATE OF CORRECTION

Patent No. 3,614,397          Dated October 19, 1971

Inventor(s) Walter L. Probert and Steven R. Finch

It is certified that error appears in the above-identified patent and that said Letters Patent are hereby corrected as shown below:

(Continued)

| | | | | |
|---|---|---|---|---|
| Column | 17, | Line | 67, | cancel "tout" and substitute --- out ---; |
| Column | 18, | Line | 11, | cancel "10th" and substitute --- tenth ---; |
| | | Line | 16, | cancel "10th" and substitute --- tenth ---; |
| Column | 19, | Line | 2, | cancel "ANDegate" and substitute --- AND gate ---; |
| | | Line | 14, | cancel the comma (,) after "FIG. 2" and substitute a --- period (.) ---; |
| | | Line | 43 | after "269" insert --- when the switch 226 closes in the home position. The relay 269 ---; |

-3-

UNITED STATES PATENT OFFICE
CERTIFICATE OF CORRECTION

Patent No. 3,614,397               Dated October 19, 1971

Inventor(s) Walter L. Probert and Steven R. Finch

It is certified that error appears in the above-identified patent and that said Letters Patent are hereby corrected as shown below:

(Continued)

Column 19, Line 48,    before "event" insert --- the ---;

Column 20, Line 25,    cancel "35-5" (second occurrence) and substitute --- 35-6 ---;

Line 54,    before "Claim 1" insert --- We claim: ---;

Column 20, Line 74, CLAIM 1    cancel "said" before "sequentially";

Column 21, Line 16, CLAIM 4    cancel "in" and substitute --- of ---;

Column 21, Line 31, CLAIM 5    insert a "hyphen" --- (-) --- after "sequentially" and delete the "hyphen" (-) after "character";

UNITED STATES PATENT OFFICE
CERTIFICATE OF CORRECTION

Patent No. 3,614,397         Dated October 19, 1971

Inventor(s) Walter L. Probert and Steven R. Finch

It is certified that error appears in the above-identified patent and that said Letters Patent are hereby corrected as shown below:
(Continued)

Column 23, Line 13, CLAIM 18    cancel the "comma (,)" at the end of the line;

Column 23, Line 17, CLAIM 18    cancel "ters" at the beginning of the line and substitute --- ter ---.

Signed and sealed this 16th day of 1972. MAY

SEAL)
ttest:

DWARD M. FLETCHER, JR.
ttesting Officer

ROBERT GOTTSCHALK
Commissioner of Patents